(12) United States Patent
Janson et al.

(10) Patent No.: US 8,968,144 B2
(45) Date of Patent: Mar. 3, 2015

(54) MULTI-SPEED TRANSMISSION

(71) Applicant: Ford Global Technologies, LLC, Dearborn, MI (US)

(72) Inventors: David Allen Janson, Plymouth, MI (US); Gregory Daniel Goleski, Rochester Hills, MI (US); Jeffrey Edward Maurer, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/186,060

(22) Filed: Feb. 21, 2014

(65) Prior Publication Data

US 2014/0296022 A1   Oct. 2, 2014

Related U.S. Application Data

(60) Provisional application No. 61/806,015, filed on Mar. 28, 2013.

(51) Int. Cl.
  F16H 3/44 (2006.01)
  F16H 37/06 (2006.01)
  F16H 3/46 (2006.01)
  F16H 3/66 (2006.01)

(52) U.S. Cl.
  CPC .. F16H 3/46 (2013.01); F16H 3/66 (2013.01); F16H 2003/442 (2013.01); F16H 2003/447 (2013.01); F16H 2200/0065 (2013.01); F16H 2200/2012 (2013.01); F16H 2200/2046 (2013.01); F16H 2200/2097 (2013.01); F16H 2200/2082 (2013.01)
  USPC .......................... 475/283; 475/330; 475/297

(58) Field of Classification Search
  None
  See application file for complete search history.

(56) References Cited

U.S. PATENT DOCUMENTS

| | | | |
|---|---|---|---|
| 6,960,149 B2 | 11/2005 | Ziemer | |
| 7,841,457 B2 * | 11/2010 | Crafton et al. | 192/48.619 |
| 7,998,013 B2 | 8/2011 | Phillips et al. | |
| 8,343,005 B2 * | 1/2013 | Hart et al. | 475/276 |
| 8,398,522 B2 | 3/2013 | Bauknecht et al. | |
| 2012/0004069 A1 * | 1/2012 | Phillips et al. | 475/296 |
| 2012/0115672 A1 | 5/2012 | Gumpoltsberger et al. | |

FOREIGN PATENT DOCUMENTS

| | | | |
|---|---|---|---|
| EP | 1422441 A2 * | 5/2004 | |
| WO | WO 2013159993 A1 * | 10/2013 | |

OTHER PUBLICATIONS

Benford, Howard L. and Leising, Maurice B., "The Lever Analogy: A New Tool in Transmission Analysis", Paper No. 810102, pp. 429-437, 0096-736X/82/9001-0429, Copyright 1982 Society of Automotive Engineers, Inc.

* cited by examiner

*Primary Examiner* — Justin Holmes
*Assistant Examiner* — Timothy Hannon
(74) *Attorney, Agent, or Firm* — James Dottavio; Brooks Kushman P.C.

(57) ABSTRACT

A transmission gearing arrangement includes four simple planetary gear sets arranged in two planes to reduce axial length. Six shift elements, including two input clutches, two output clutches, and two brakes, are engaged in combinations of three to establish nine forward speed ratios and one reverse speed ratio. The two output clutches may be assembled into a module suitable for testing before installation.

11 Claims, 2 Drawing Sheets

MULTI-SPEED TRANSMISSION

CROSS-REFERENCE TO RELATED APPLICATIONS

This application claims the benefit of U.S. provisional application Ser. No. 61/806,015 filed Mar. 28, 2013, the disclosure of which is hereby incorporated in its entirety by reference herein.

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds in both forward and reverse. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. When the vehicle is at high speed, the transmission is usually operated at a low speed ratio to permit the engine to facilitate quiet, fuel efficient cruising.

Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

A transmission includes first and second simple planetary gear sets and first and second clutches. The sun gear of the first planetary gear set is fixedly held against rotation. The sun gear of the second gear set is fixedly coupled to the ring gear of the first gear set and the carrier of the second gear set is fixedly coupled to an input. The first gear set may be located radially outside the second gear set. The first clutch selectively couples the carrier of the first gear set to an output. The second clutch selectively couples the ring gear of the second gear set to the output. The transmission may also include third and fourth planetary gear sets with specified fixed connections. The third gear set may be located radially outside the fourth gear set. The transmission may further include third and fourth clutches and first and second brakes.

In another embodiment, a transmission includes three gearing arrangements. A first gearing arrangement fixedly establishes an underdrive speed relationship between an intermediate shaft and a first shaft. The first gearing arrangement may be implemented, for example, as a simple planetary gear set with the sun fixedly held against rotation, the ring gear fixedly coupled to the intermediate shaft, and the carrier fixedly coupled to the first shaft. A second gearing arrangement fixedly establishes a linear speed relationship among the intermediate shaft, an input, and a second shaft. The second gearing arrangement may be implemented, for example, as a simple planetary gear set with the sun fixedly coupled to the intermediate shaft, the carrier fixedly coupled to the input, and the ring fixedly coupled to the second shaft. A third gearing arrangement fixedly establishes a linear speed relationship among a third shaft, a fourth shaft, the intermediate shaft, and a fifth shaft. The third gearing arrangement may be implemented, for example, as two simple planetary gear sets having a common carrier fixedly coupled to the intermediate shaft, a first sun gear fixedly coupled to the third shaft, a first ring gear and second sun gear fixedly coupled to the fifth shaft, and a second ring gear fixedly coupled to the fourth shaft.

In another embodiment, a transmission includes four planetary gear sets. A first sun gear is fixedly held against rotation. A second carrier is fixedly coupled to an input. A third sun gear is fixedly coupled to a fourth ring gear. A first ring gear, second sun gear, and third and fourth carriers are mutually fixedly coupled. The transmission may also include two output clutches. A first output clutch selectively couples the first carrier to the output. A second output clutch selectively couples the second ring gear to the output. The transmission may further include two input clutches and two brakes.

DETAILED DESCRIPTION

Figure 1:
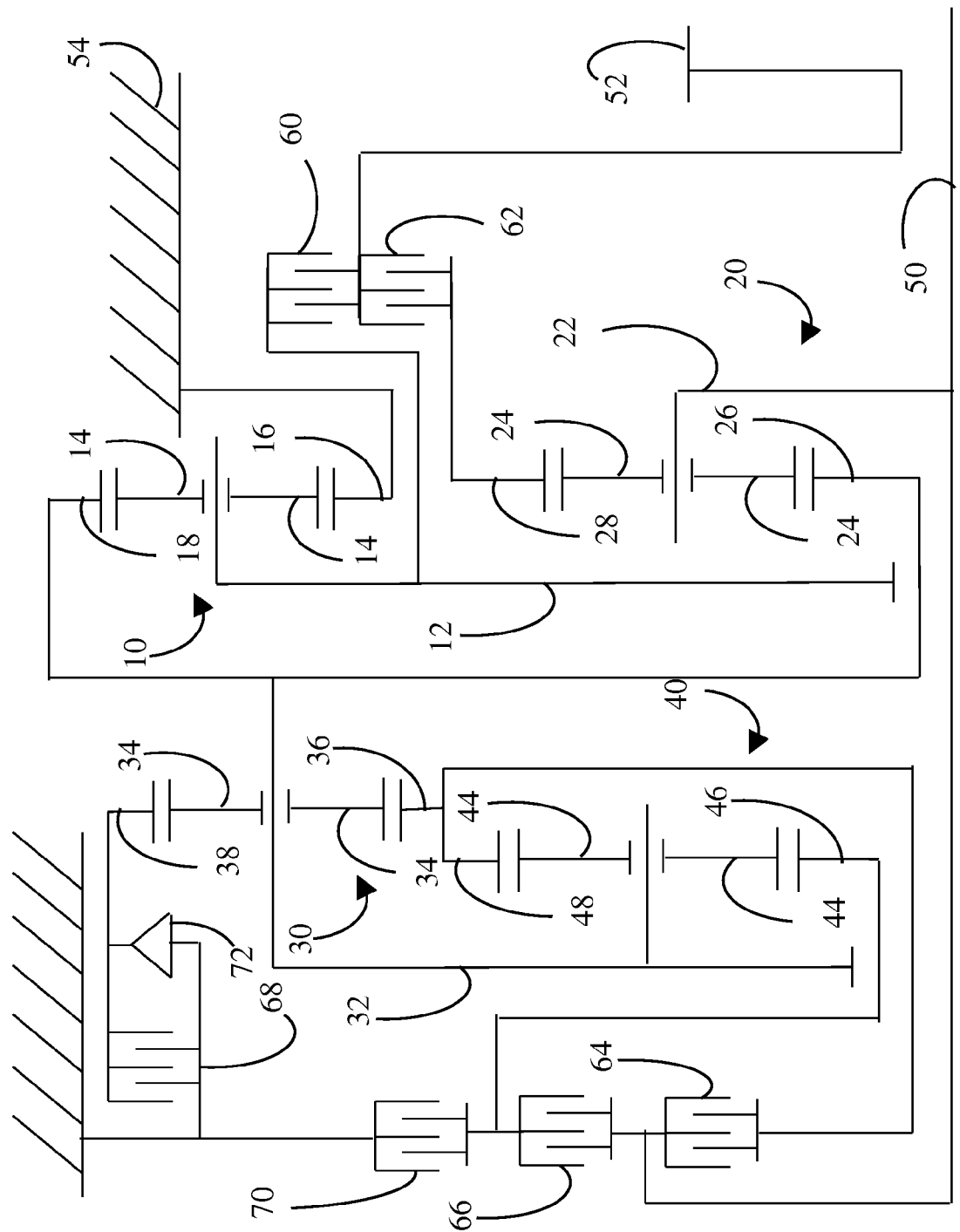
FIG. 1 is a schematic representation of a transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to spline lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or one way brakes. Shift elements may be positive engagement devices such as dog clutches or may be friction devices capable of transmitting torque between elements in the presence of relative rotation. Two rotating elements are coupled if they are either fixedly coupled or selectively coupled.

A gearing arrangement is a collection of gearing elements and shift elements configured to establish specified speed relationships among a set of shafts. Some speed relationships, called fixed speed relationships, are established regardless of the state of any shift elements. Other speed relationships, called selective speed relationships, are established only when particular shift elements are fully engaged. The speed of a shaft is positive when the shaft rotates in one direction and negative when the shaft rotates in the opposite direction. A proportional speed relationship exists between a first shaft and a second shaft when the ratio of their speeds is constrained to be a predetermined value. A proportional speed relationship is a reverse speed relationship if the two shafts rotate in opposite directions. A proportional speed relationship between a first shaft and a second shaft is an underdrive relationship if the ratio of the second shaft speed to the first shaft speed is between zero and one. Similarly, a proportional speed relationship between a first shaft and a second shaft is an overdrive relationship if the ratio of the second shaft speed to the first shaft speed is greater than one. A linear speed relationship exists among an ordered list of shafts when i) the first and last shaft in the ordered list are constrained to have the most extreme speeds, ii) the speeds of the remaining shafts are each constrained to be a weighted average of the speeds of the first and last shafts, and iii) when the speeds of the shafts differ, they are constrained to be in the listed order, either increasing or decreasing.

FIG. 1 schematically illustrates the gearing arrangement of a transmission gearbox. The transmission utilizes four simple planetary gear sets 10, 20, 30, and 40. Each simple planetary gear set includes a planet carrier that rotates about a central axis and supports a set of planet gears such that the planet gears rotate with respect to the planet carrier. External gear teeth on the planet gears mesh with external gear teeth on sun gears and with internal gear teeth on ring gears. The sun gear and ring gear are also supported to rotate about the central axis. To reduce axial length, gear set 10 is positioned radially outside and in a common plane with gear set 20. Similarly, gear set 30 is positioned radially outside of gear set 40. Gear sets 30 and 40 share a common carrier 32 but have separate planet gears 34 and 44.

A simple planetary gear set is a type of gearing arrangement that establishes a fixed linear speed relationship among the sun gear, the carrier, and the ring gear. Other known types of gearing arrangements also establish a fixed linear speed relationship among three rotating elements. For example, a double pinion planetary gear set establishes a fixed linear speed relationship among the sun gear, the ring gear, and the carrier. A suggested ratio of gear teeth for each planetary gear set is listed in Table 1.

TABLE 1

| | |
|---|---|
| Ring 18/Sun 16 | 1.467 |
| Ring 28/Sun 26 | 1.927 |
| Ring 38/Sun 36 | 1.658 |
| Ring 48/Sun 46 | 1.712 |

Sun gear 16 is fixedly held against rotation; carrier 22 is fixedly coupled to input 50; sun gear 36 is fixedly coupled to ring gear 48; and common carrier 32, ring gear 18, and sun gear 26 are mutually fixedly coupled. Output 52 is selectively coupled to carrier 12 by clutch 60 and selectively coupled to ring gear 28 by clutch 62. Input 50 is selectively coupled to the combination of sun gear 36 and ring gear 48 by clutch 64. Sun gear 46 is selectively coupled to input 50 by clutch 66 and selectively held against rotation by brake 70. Ring gear 38 is selectively held against rotation by brake 68. One-way-brake 72 passively precludes the ring gear 38 from rotating in a reverse direction while permitting rotation in a positive direction.

Various subsets of the gearing arrangement of FIG. 1 establish particular speed relationships. Gear sets 30 and 40 collectively establish a linear speed relationship among sun gear 46, ring gear 38, common carrier 32, and the combination of sun gear 36 and ring gear 48. Any gearing arrangement having two planetary gear sets with two elements of the first gear set fixedly coupled to two respective elements of the second gear set fixedly establishes a linear speed relationship among the resulting four shafts. Gear sets 30 and 40 are linked to gear sets 10 and 20 by an intermediate shaft that includes common carrier 32, ring gear 18, and sun gear 26. Gear sets 30 and 40 in combination with clutches 64 and 66 and brakes 68 and 70 selectively establish several proportional speed relationships. When brake 70 is engaged, the first shaft is held against rotation. When clutch 66 and brake 68 are engaged, a reverse speed relationship is established between the input and the intermediate shaft. When brakes 68 and 70 are both engaged, the intermediate shaft is held against rotation. When clutch 64 is engaged in combination with either brake 68 or brake 70, underdrive speed relationships are established between the input and the intermediate shaft. Finally, when clutches 64 and 66 are both engaged, the input and the intermediate shaft rotate as a unit. Gear set 10 fixedly establishes an underdrive speed relationship between the intermediate shaft and carrier 12.

Engaging the shift elements as shown in Table 2 establishes nine forward speed ratios and one reverse speed ratio between input 50 and output 52. An X indicates that the shift element must be engaged to establish the power transfer path. An (X) indicates that the shift element is not required to establish the power path, but may be engaged to facilitate shifts to other ratios. When the gear sets have tooth numbers as indicated in Table 1, the speed ratios have the values indicated in Table 2.

TABLE 2

| | 60 | 62 | 64 | 66 | 68/72 | 70 | Ratio | Step |
|---|---|---|---|---|---|---|---|---|
| Rev | X | | | X | X | | -3.09 | 69% |
| 1st | X | | X | | X | | 4.47 | |
| 2nd | X | | X | | | X | 2.66 | 1.68 |
| 3rd | X | | X | X | | | 1.68 | 1.58 |
| 4th | X | X | (X) | | | | 1.23 | 1.36 |
| 5th | | X | X | X | | | 1.00 | 1.23 |
| 6th | | X | X | | | X | 0.84 | 1.19 |
| 7th | | X | X | | X | | 0.76 | 1.11 |
| 8th | | X | | | X | X | 0.66 | 1.15 |
| 9th | | X | | X | X | | 0.56 | 1.19 |

Figure 2:
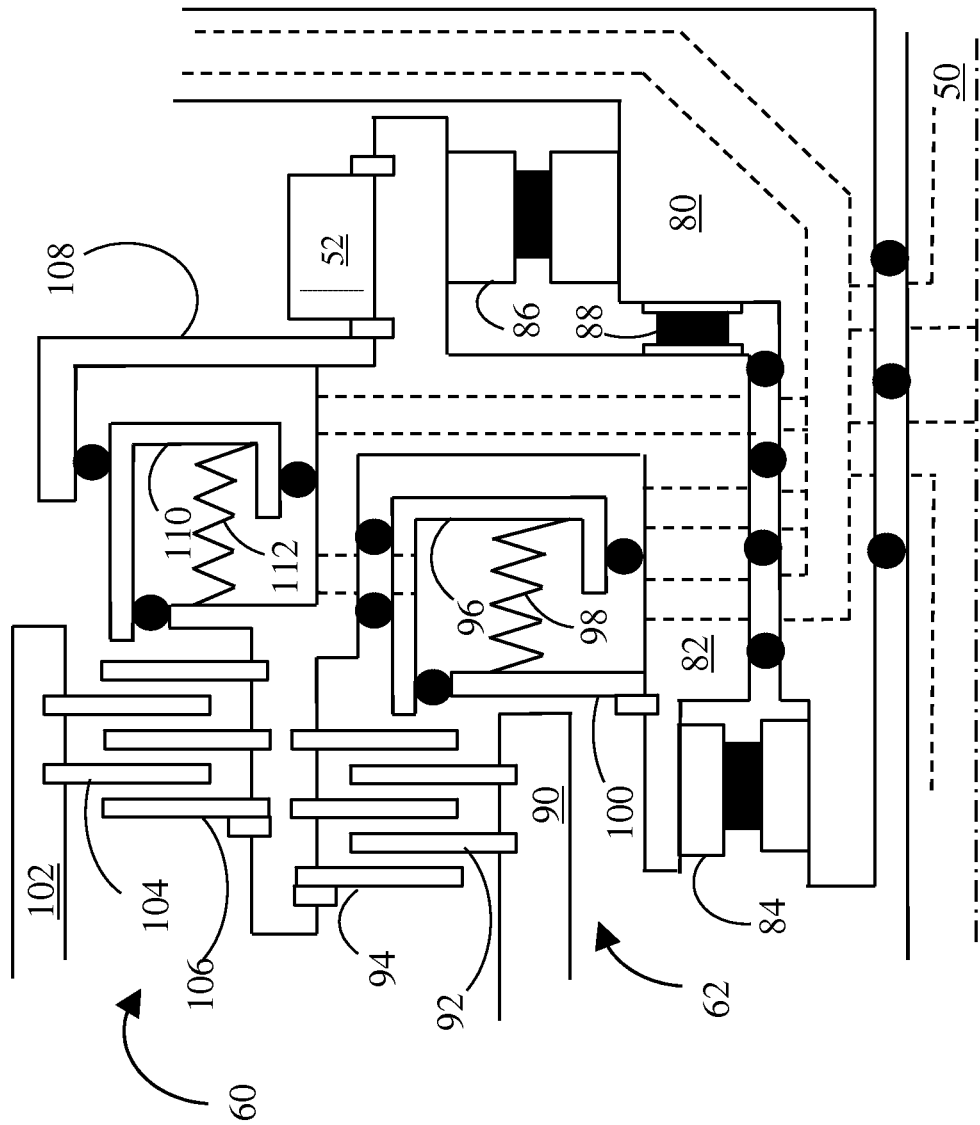
FIG. 2 is a cross sectional view of a two clutch module suitable for use in the transmission gearing arrangement of FIG. 1.

FIG. 2 illustrates the construction of clutches 60 and 62 in more detail. These two clutches may be constructed as a two clutch module suitable for assembly and test as a sub-assembly. Front support 80 is rigidly mounted to transmission case 54. Clutch housing 82 is supported for rotation about front support 80 by bearings 84 and 86. Bearings 84 and 86 are separated axially which reduces the bearing forces required to react a given bending moment. The separation between the bearings also provides space for fluid to flow from the front support to the clutch housing between these bearings. Clutch housing 82 is restrained from axial movement by thrust bearing 88.

Clutch hub 90 is fixedly coupled to ring gear 28. A set of friction plates 92 are splined to clutch hub 90 at their inner diameter such that the friction plates rotate with the clutch hub but are free to slide axially. Friction plates 92 are interleaved with a set of separator plates 94. Each separator plate is splined to the clutch housing 82 at its outer diameter such that the separator plates rotate with the clutch housing but are free to slide axially. The separator plate on the left end, which may be called a reaction plate, is held in place axially by a snap ring. To apply clutch 62, pressurized fluid is routed from a valve body, into the front support, into the clutch housing, and then into an apply chamber between clutch housing 82 and piston 96. As the fluid passes from front support 80 to clutch housing 82, seals ensure that the fluid flows to the correct passageway in the clutch housing. In response to the pressurized fluid, piston 96 slides to the left and squeezes the friction plates between the separator plates. Friction between the friction plates and separator plates forces clutch hub 90 to rotate at the same speed as clutch housing 82. When the fluid pressure is relieved, return spring 98 forces piston 96 to the right relative motion between the friction plates and the separator plates. Return spring 98 reacts against balance dam 100 which is constrained from moving axially with respect to clutch housing 82 by a snap ring. When clutch housing 82 rotates, fluid in the apply chamber is pressurized by centrifugal force. To prevent this force from engaging the clutch, unpressurized fluid is routed to a balance chamber on the opposite side of piston 96.

Clutch 60 is structured similarly. Clutch hub 102 is fixedly coupled to carrier 12. Friction plates 104 are splined to clutch hub 102 at their outer diameter and are interleaved with separator plates 106 which are splined to clutch housing 82 at their inner diameter. To apply clutch 60, pressurized fluid is routed from a valve body, into the front support, into the clutch housing, and then into an apply chamber between cap 108 and piston 110. Return spring 112 forces piston 110 to the right when pressure is removed. Unpressurized fluid is routed from the clutch 62 balance chamber, through a hole in piston 96, through a passageway in clutch housing 82, into a balance chamber on the left side of piston 110.

This two clutch module may be assembled as follows. Piston 96, return spring 98, and balance dam 100 are assembled into clutch housing 82 from the left and secured with a snap ring. Then, separator plates 94, interleaved with friction plates 92, are splined to clutch housing 82 from the left and secured with a snap ring. Similarly, separator plates 106, interleaved with friction plates 104, are splined to clutch housing 82 from the left and secured with a snap ring. Finally, return spring 112, piston 110, and cap 108 are assembled from the right and secured with a snap ring. In this condition, the clutch module can be functionally tested. Before installation into the transmission, output gear 52 is splined to clutch housing 82 and secured. During assembly, friction plates 92 are splined to hub 90 and friction plates 104 are splined to hub 102.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   a first planetary gearset having a first sun fixedly held against rotation, a first ring, and a first carrier;
   a second planetary gearset having a second sun fixedly coupled to the first ring, a second ring, and a second carrier fixedly coupled to an input;
   a third planetary gearset having a third sun, a third ring, and a third carrier fixedly coupled to the first ring; and
   a fourth planetary gearset having a fourth sun, a fourth ring fixedly coupled to the third sun, and a fourth carrier fixedly coupled to the first ring;
   a first clutch configured to selectively couple the first carrier to an output; and
   a second clutch configured to selectively couple the second ring to the output.

2. The transmission of claim 1 wherein the first sun is radially outside the second ring.

3. The transmission of claim 1 wherein the third sun is radially outside the fourth ring.

4. The transmission of claim 1 further comprising:
   a third clutch configured to selectively couple the third sun to the input;
   a fourth clutch configured to selectively couple the fourth sun to the input;
   a first brake configured to selectively hold the third ring against rotation; and
   a second brake configured to selectively hold the fourth sun against rotation.

5. The transmission of claim 4 further comprising a one way brake configured to passively hold the third ring against rotation in a reverse direction and to permit rotation in a forward direction.

6. The transmission of claim 1 further comprising:
   a front support fixedly held against rotation;
   a first hub fixedly coupled to the first carrier;
   a second hub fixedly coupled to the second ring; and
   a clutch housing supported for rotation about the front support, the output fixedly coupled to the clutch housing, wherein
      the first clutch comprises a first set of separator plates secured for rotation with the clutch housing and a first set of friction plates interleaved with the first set of separator plates and secured for rotation with the first hub; and
      the second clutch comprises a second set of separator plates secured for rotation with the clutch housing and a second set of friction plates interleaved with the second set of separator plates and secured for rotation with the second hub.

7. The transmission of claim 6 wherein:
   the clutch housing is supported for rotation about the front support by a first bearing and a second bearing;

the clutch housing defines a first set of fluid passageways;

the front support defines a second set of fluid passageways; and a set of seals are configured to route fluid from each passageway in the front support, between the first bearing and the second bearing, to a corresponding fluid passageway in the clutch housing.

8. A transmission comprising four planetary gearsets wherein:

a sun of a first gearset is fixedly held against rotation;

a carrier of a second gearset is fixedly coupled to an input;

a sun of a third gearset is fixedly coupled to a ring of a fourth gearset; and a ring of the first gearset, a sun of the second gearset, and carriers of the third and fourth gearsets are mutually fixedly coupled.

9. The transmission of claim 8 further comprising:

a first clutch configured to selectively couple a carrier of the first gearset to an output; and a second clutch configured to selectively couple a ring of the second gearset to the output.

10. The transmission of claim 9 further comprising:

a third clutch configured to selectively couple the sun of the third gearset to the input;

a fourth clutch configured to selectively couple a sun of the fourth gearset to the input;

a first brake configured to selectively hold a ring of the third gearset against rotation; and a second brake configured to selectively hold the sun of the fourth gearset against rotation.

11. The transmission of claim 10 further comprising a one way brake configured to passively hold the ring of the third gearset against rotation in a reverse direction and to permit rotation in a forward direction.

* * * * *